US012358724B2

(12) United States Patent
Gjerdevik et al.

(10) Patent No.: US 12,358,724 B2
(45) Date of Patent: Jul. 15, 2025

(54) ROBOTIC CONSOLIDATION STATION AND STORAGE SYSTEM

(71) Applicant: Autostore Technology AS, Nedre Vats (NO)

(72) Inventors: Øystein Gjerdevik, Skjold (NO); Joakim Aleksander Myrbakken, Skudeneshavn (NO)

(73) Assignee: AutoStore Technology AS, Nedre Vats (NO)

( * ) Notice: Subject to any disclaimer, the term of this patent is extended or adjusted under 35 U.S.C. 154(b) by 213 days.

(21) Appl. No.: 17/907,631

(22) PCT Filed: Jan. 28, 2021

(86) PCT No.: PCT/EP2021/051965
§ 371 (c)(1),
(2) Date: Sep. 28, 2022

(87) PCT Pub. No.: WO2021/197681
PCT Pub. Date: Oct. 7, 2021

(65) Prior Publication Data
US 2023/0131214 A1 Apr. 27, 2023

(30) Foreign Application Priority Data

Mar. 31, 2020 (NO) .................................... 20200389

(51) Int. Cl.
*B65G 1/06* (2006.01)
*B65G 1/04* (2006.01)

(52) U.S. Cl.
CPC ............. *B65G 1/06* (2013.01); *B65G 1/0464* (2013.01); *B65G 2201/0235* (2013.01)

(58) Field of Classification Search
CPC ...... B65G 1/0478; B65G 1/0464; B65G 1/06; B65G 1/1378; B65G 2201/0235; B65G 1/1373; B65G 1/1376
See application file for complete search history.

(56) References Cited

U.S. PATENT DOCUMENTS 9,950,863 B2 * 4/2018 O'Brien ............... B65G 1/1373
10,913,612 B2 * 2/2021 Wagner ............... B65G 1/0492
(Continued)

FOREIGN PATENT DOCUMENTS

CN 106660704 A 5/2017
CN 108367863 A 8/2018
(Continued)

OTHER PUBLICATIONS

Search Report issued in Norwegian Application No. 20200380; Dated Oct. 26, 2020 (2 pages).
(Continued)

*Primary Examiner* — Glenn F Myers
(74) *Attorney, Agent, or Firm* — Baker Botts L.L.P.

(57) ABSTRACT

Storage containers may be stored a storage system including a framework structure. A robotic consolidation station for use in the storage system includes a first conveyor pathway for transfer of storage containers accommodating items to be picked, a second conveyor pathway for transfer of storage containers in which items are to be consolidated or have been consolidated, and a robotic picking arm arranged to reach the first conveyor pathway and the second conveyor pathway. Each of the first conveyor pathway and the second conveyor pathway includes a first end and a second end. Each first end may be operatively connected to a container outlet of the framework structure for transfer of storage containers from the framework structure and each second end may be operatively connected to a container inlet of the framework structure for transfer of storage containers into (Continued)

the framework structure. The first conveyor pathway includes a picking section. The second conveyor pathway includes a consolidation section. The robotic picking arm is arranged such that items may be picked from a first storage container arranged upon the picking section by use of the robotic picking arm and transferred to a second storage container arranged upon the consolidation section by use of the robotic picking arm. The first conveyor pathway is independently operable of the consolidation section and arranged such that a first storage container may be transferred from a container outlet to a container inlet via the picking section while a second storage container is arranged upon the consolidation section.

18 Claims, 8 Drawing Sheets

(56) References Cited

U.S. PATENT DOCUMENTS

| | | | |
|---|---|---|---|
| 11,905,058 B2* | 2/2024 | Lert, Jr. | B65B 5/08 |
| 2014/0244026 A1* | 8/2014 | Neiser | B65G 1/1378 |
| | | | 700/216 |
| 2018/0312336 A1* | 11/2018 | Wagner | B25J 9/026 |
| 2019/0127147 A1 | 5/2019 | Wagner et al. | |
| 2021/0221615 A1* | 7/2021 | Buchmann | B65G 1/1373 |

FOREIGN PATENT DOCUMENTS

| | | |
|---|---|---|
| CN | 110691742 A | 1/2020 |
| EP | 2468677 A1 | 6/2012 |
| NO | 317366 B1 | 10/2004 |
| WO | 2014/075937 A1 | 5/2014 |
| WO | 2014/090684 A1 | 6/2014 |
| WO | 2015/193278 A1 | 12/2015 |
| WO | 2018132855 A1 | 7/2018 |
| WO | 2018/146304 A1 | 8/2018 |
| WO | 2019101366 A1 | 5/2019 |
| WO | 2019206971 A1 | 10/2019 |

OTHER PUBLICATIONS

International Search Report issued in International Application No. PCT/EP2021/051965, mailed May 6, 2021 (3 pages).
Written Opinion issued in International Application No. PCT/EP2021/051965; Dated May 6, 2021 (8 pages).
Bruce Sheppard, European Examination Report for EU Application No. 21702464.5, mailed Jan. 3, 2025, 4 pages, European Patent Office, Rijswijk, Netherlands.
Li Wenyue, Notification of the First Office Action and Search Report for Chinese Patent Application No. 2021800389605, mailed Nov. 7, 2024, 20 pages (including translation), China National Intellectual Property Administration, Beijing, China.

* cited by examiner

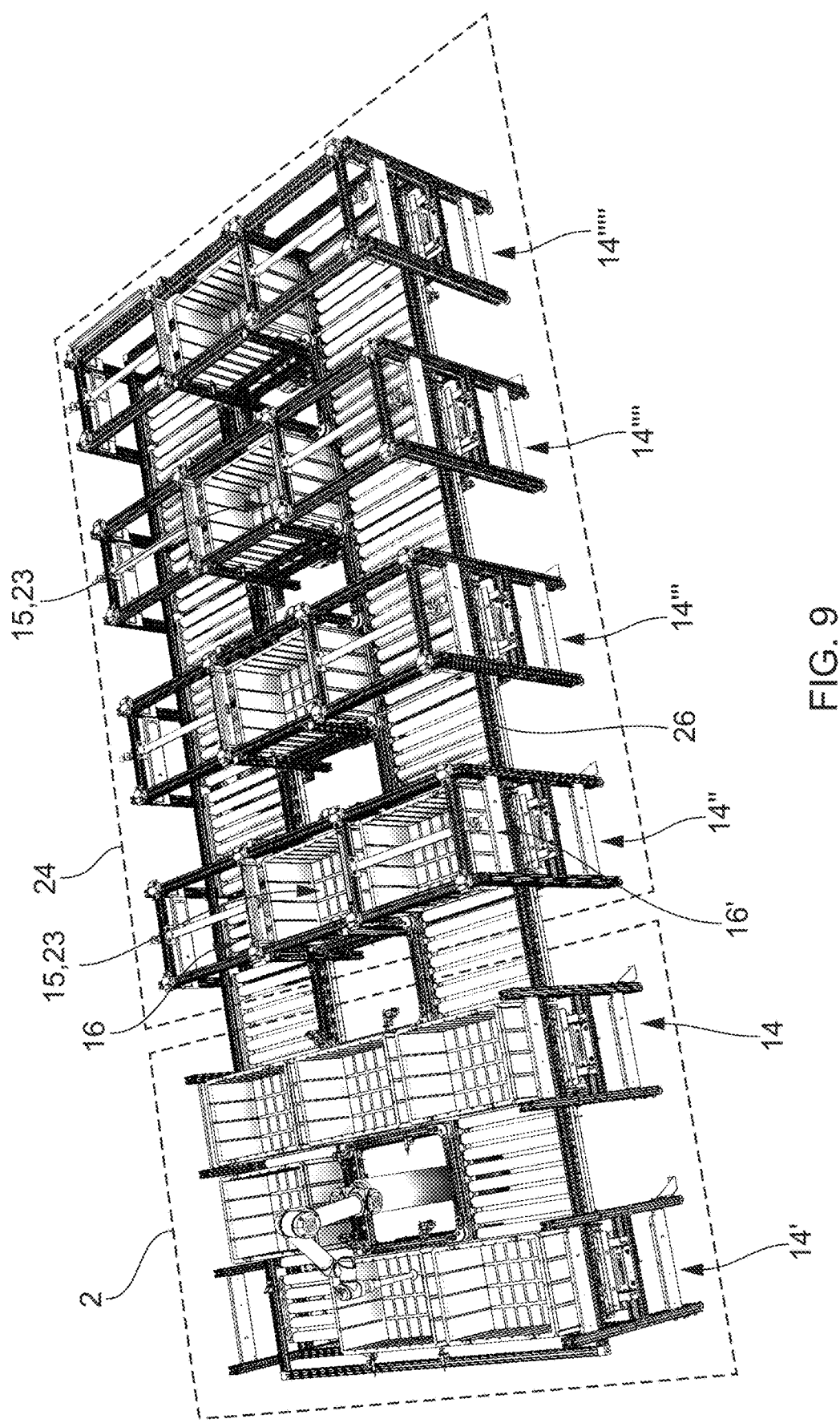

ROBOTIC CONSOLIDATION STATION AND STORAGE SYSTEM

FIELD OF THE INVENTION

The present invention relates to a robotic consolidation station for an automated storage and retrieval system and an automated storage and retrieval system featuring a robotic consolidation station.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminium profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 201 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

A prior art access station is disclosed in WO 2019/206971 A1. The access station is connected to a container outlet, wherein a container may be provided from the framework 100 of the storage system and a container inlet, wherein a container may be introduced to the framework 100 of the storage system.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles.

Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105 or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

An operation performed in some prior art storage systems is the consolidation of multiple different items picked from the storage grid, e.g. to consolidate multiple items belonging to a single customer order. The multiple items are consolidated for further processing, such as packaging in a single package for shipment to a customer.

In the prior art systems, the consolidation of multiple items is performed by first transferring the storage container(s) containing the items of an order from the storage grid to a manual picking/stocking station (i.e. an access station), e.g. as disclosed in WO 2019/206971 A1. At the picking/stocking station, an operator picks the required items of an order and places them in a single package for further processing, e.g. shipment to a customer. Different items to be consolidated are normally stored in different storage containers and the speed of the consolidation process is thus restricted by the speed at which the different storage containers are made available at the picking/stocking station. However, while benefits are achieved through consolidation processes, it has been found that identical orders having the same items from the same storage containers are not processed significantly faster than non-identical orders since the storage containers must be circulated between the picking/stocking station and the framework of the storage system for each order due to the sequential access to the different storage containers. Thus, further improvements of the prior art consolidation operations would be desirable.

An objective of the present invention is to provide a storage system which is more effective than prior art systems in the consolidation of items.

SUMMARY OF THE INVENTION

The present invention is defined by the attached claims and in the following:
  In a first aspect, the present invention provides a robotic consolidation station for use in a storage system, the storage system comprising a framework structure in which storage containers may be stored; and
  the consolidation station comprises a first conveyor pathway for transfer of storage containers accommodating items to be picked, a second conveyor pathway for transfer of storage containers in which items are to be consolidated or have been consolidated and a robotic picking arm arranged to reach the first conveyor pathway and the second conveyor pathway, wherein
  each of the first conveyor pathway and the second conveyor pathway comprises a first end and a second end, wherein each first end may be operatively connected to a container outlet of the framework structure for transfer of storage containers from the framework structure and each second end may be operatively connected to a container inlet of the framework structure for transfer of storage containers into the framework structure; and
  the first conveyor pathway comprises a picking section, and the second conveyor pathway comprises a consolidation section; and
  the robotic picking arm is arranged such that items may be picked from a first storage container arranged upon the picking section by use of the robotic picking arm and transferred to a second storage container arranged upon the consolidation section by use of the robotic picking arm; and
  the first conveyor pathway is independently operable of the consolidation section and arranged such that a first storage container may be transferred from a container outlet to a container inlet via the picking section while a second storage container is arranged upon the consolidation section.

In an embodiment of the robotic consolidation station, a plurality of storage containers may be arranged upon the consolidation section, while a first storage container is transferred from a container outlet to a container inlet via the picking section.

In an embodiment of the robotic consolidation station, the picking section may be arranged parallel to the consolidation section.

In an embodiment of the consolidation station, the consolidation station may be for storage containers having a rectangular horizontal periphery and the picking section and the consolidation section may be arranged such that a first storage container arranged at the picking section will have one of its long sides facing, and parallel to, one of the long sides of a second storage container arranged at the consolidation section.

In an embodiment of the robotic consolidation station, the robotic picking arm may be arranged such that the moving distance of the robotic picking arm when moving between the picking section and the consolidation section is minimized. The robotic picking arm may be arranged between the picking section and the consolidation section. The robotic picking arm may have a base, wherein the base is mounted substantially equidistant from the picking section and the consolidation section, e.g. equidistant from a center of the picking section and a center of the consolidation section.

In an embodiment of the robotic consolidation station the first conveyor pathway and the second conveyor pathway may have a common first end, i.e. the first end of the first conveyor pathway and the first end of the second conveyor pathway are the same end.

In an embodiment of the robotic consolidation station, the first conveyor pathway and the second conveyor pathway may have a common second end, i.e. the second end of the first conveyor pathway and the first end of the second conveyor pathway are the same end.

In an embodiment of the robotic consolidation station, the common first end of the first and second conveyor pathway comprises an outlet conveyor element operatively connectable to a container outlet. The outlet conveyor element may be a conveyor unit for accommodating and transferring a single storage container at a time.

In an embodiment of the robotic consolidation station, the common second end of the first and second conveyor pathway comprises an inlet conveyor element operatively connectable to a container inlet. The inlet conveyor element may be a conveyor unit for accommodating and transferring a single storage container at a time.

In an embodiment of the robotic consolidation station, the first conveyor pathway and the second conveyor pathway comprise a common first conveyor intersection from which a storage container exiting a container outlet may be transferred in a first direction to the picking section or in a second direction to the consolidation section. The first direction may be perpendicular to the second direction.

In an embodiment of the robotic consolidation station, the first conveyor pathway and the second conveyor pathway comprise a common second conveyor intersection from which a storage container arriving from any of the picking section and the consolidation section may be transferred to a container inlet.

In an embodiment of the robotic consolidation station, the first conveyor pathway comprises a first conveyor module and the second conveyor pathway comprises a second conveyor module, each conveyor module is able to accommodate a row of three storage containers and comprises a middle container section, a first end container section and a second end container section, each of the container sections is arranged to accommodate a single storage container, and each of the conveyor modules comprises a movement assembly arranged to move a storage container in a horizontal direction between any of the end container sections and the middle container section, and each of the end container sections features a roller conveyor arranged to transport a storage container in a direction perpendicular to the horizontal direction between any of the end container sections and the middle container section.

In an embodiment of the robotic consolidation station, the picking section is the middle container section of the first conveyor module.

In an embodiment of the robotic consolidation station, the consolidation section comprises the middle container section of the second conveyor module. The consolidation section may optionally comprise any of the first and second end container sections of the second conveyor module.

In an embodiment of the robotic consolidation station, the movement assembly may be a lifting assembly arranged to lift and move a storage container in a horizontal direction between any of the end container sections and the middle container section, and the roller conveyors are arranged to transport a storage container in a direction perpendicular to the horizontal direction in which the lifting assembly may move. The lifting assembly may comprise a sled being movable in a horizontal direction and two parallel beams connected to the sled and arranged to lift at least one storage container in a vertical direction. In other words, the two parallel beams may be connected to the sled such that the beams may lift at least one storage container in a vertical direction and move the storage container in a horizontal direction via the sled.

In an embodiment of the robotic consolidation station, the first end container sections and the second end container sections, respectively, of the first conveyor module and the second conveyor module may be connected by a conveyor element arranged to transfer a container between the respective first and second end container sections.

In an embodiment of the robotic consolidation station, each of the first end container section and the second end container section of the first conveyor module may be connected to a respective conveyor element for connection to a container outlet and a container inlet of the framework structure.

In a second aspect, the present invention provides a storage system comprising a robotic consolidation station according to any embodiment of the first aspect of the invention, wherein
 the storage system comprises a framework structure, in which storage containers may be stored, a container outlet for transfer of storage containers from the framework structure and a container inlet for transfer of storage containers into the framework structure;
 wherein the first conveyor pathway and the second conveyor pathway of the robotic consolidation station is operably connected to the container outlet and the container inlet.

In an embodiment, the storage system may comprise at least one container handling vehicle, and the framework structure may comprises multiple storage columns in which storage containers may be stored on top of one another in vertical stacks, and the container handling vehicle is operated on a rail system at a top level of the framework structure for retrieving storage containers from, and storing storage containers in, the storage columns, and for transporting the storage containers horizontally across the rail system.

In an embodiment of the storage system the framework structure may comprise at least one port column through which a storage container may be transferred between a top level of the framework structure and a transfer position at a lower level of the framework structure, the transfer position being operably connected to the robotic consolidation station via the container outlet and the container inlet. The transfer position may be arranged at the same level as the container inlet and the container outlet. The storage container may be transferred between the top level of the framework structure and the transfer position by use of a container handling vehicle.

In an embodiment of the storage system, the storage system may comprise a container relay assembly for transfer of a storage container between the transfer position and the consolidation station, the container relay assembly comprises at least one relay conveyor module, the relay conveyor module is able to accommodate a row of three storage containers and comprises a middle container section arranged at the transfer position, a first end container section and a second end container section, each of the container sections is arranged to accommodate a single storage container, and the relay conveyor module comprises a movement assembly arranged to move a storage container in a horizontal direction between any of the end container sections and the middle container section, and the roller conveyors are arranged to transport a storage container in a direction perpendicular to the horizontal direction between any of the end container sections and the middle container section. The relay conveyor modules may be substantially similar to the conveyor modules of the consolidation station.

In an embodiment of the storage system, the movement assembly may be a lifting assembly arranged to lift and move a storage container in a horizontal direction between any of the end container sections and the middle container section, and the roller conveyors are arranged to transport a storage container in a direction perpendicular to the horizontal direction in which the lifting assembly may move. The lifting assembly may comprise a sled being movable in a horizontal direction and two parallel beams connected to the sled and arranged to lift at least one container in a vertical direction.

In an embodiment, the storage system may comprise a plurality of port columns, and the container relay assembly may comprise a plurality of relay conveyor modules, wherein each middle container section is arranged at a respective transfer point.

In an embodiment of the storage system, the plurality of relay conveyor modules are interconnected at their first and second end container sections by conveyor elements able to accommodate at least one storage container and transport the at least one storage container in the same direction as the roller conveyors of the end container sections.

In a third aspect, the present invention provides a method of consolidating items stored in a storage system comprising a robotic consolidation station, wherein
 the storage system comprises a framework structure, in which storage containers may be stored, a container outlet for transfer of storage containers from the framework structure and a container inlet for transfer of storage containers into the framework structure; and
 the consolidation station comprises a first conveyor pathway for transfer of storage containers accommodating items to be picked, a second conveyor pathway for transfer of storage containers in which items are to be consolidated or have been consolidated and a robotic picking arm arranged to reach the first conveyor pathway and the second conveyor pathway, wherein
 each of the first and second conveyor pathways comprises a first end and a second end, wherein each first end is operatively connected to the container outlet and each second end is operatively connected to the container inlet; and
 the first conveyor pathway comprises a picking section, and the second conveyor pathway comprises a consolidation section; and the method comprises the steps of:
transferring a first storage container, accommodating at least one first item, from the container outlet via the first conveyor pathway to the picking section;
transferring a second storage container from the container outlet via the second conveyor pathway to the consolidation section; and
picking the at least one first item from the first storage container and adding the at least one first item to the second storage container by use of the robotic picking arm.

In an embodiment of the method according to the third aspect, the method may comprise the steps of:
transferring the first storage container to the container inlet via the first conveyor pathway;
transferring a third storage container, accommodating at least one second item, from the container outlet via the first conveyor pathway to the picking section; and
picking the at least one second item from the third storage container and adding the at least one second item to the second storage container by use of the robotic picking arm.

In an embodiment of the method according to the third aspect, the first storage container may accommodate a plurality of first items, and the method may comprise the steps of:
transferring a fourth storage container from the container outlet via the second conveyor pathway to the consolidation section; and
picking at least one first item from the first storage container and adding the at least one first item to the fourth storage container by use of the robotic picking arm.

The method according to the third aspect may alternatively be termed a method of consolidating items stored in a storage system into a customer order. The customer order may be for intermediate storage or transfer to a processing facility.

In a fourth aspect, the present invention provides a method of consolidating items stored in a storage system comprising a robotic consolidation station (2), wherein
the storage system comprises a framework structure, in which storage containers may be stored, a container outlet for transfer of storage containers from the framework structure and a container inlet for transfer of storage containers into the framework structure; and
the consolidation station comprises a first conveyor pathway for transfer of storage containers accommodating items to be picked, a second conveyor pathway for transfer of storage containers in which items are to be consolidated or have been consolidated and a robotic picking arm arranged to reach the first conveyor pathway and the second conveyor pathway, wherein
each of the first and second conveyor pathways comprises a first end and a second end, wherein each first end is operatively connected to the container outlet and each second end is operatively connected to the container inlet; and
the first conveyor pathway comprises a picking section, and the second conveyor pathway comprises a consolidation section; and
the method comprises the steps of:
transferring a first storage container, accommodating at least one first item, from the container outlet via the first conveyor pathway to the picking section;
transferring a second storage container, the second storage container may be empty or having room for at least one first item, from the container outlet via the second conveyor pathway to the consolidation section; and
picking the at least one first item from the first storage container and adding the at least one first item to the second storage container by use of the robotic picking arm; and
repeating the step of picking the at least one first item from the first storage container and adding the at least one first item to the second storage container by use of the robotic picking arm until the first storage container is empty or the second storage container is full.

In an embodiment of the method according to the fourth aspect, the method may comprise the step of:
transferring the first storage container to, or towards, the container inlet via the first conveyor pathway, when the first storage container is empty.

In an embodiment of the method according to the fourth aspect, the method may comprise the steps of:
transferring a third storage container, accommodating at least one first item, from the container outlet via the first conveyor pathway to the picking section;
picking the at least one first item from the third storage container and adding the at least one first item to the second storage container by use of the robotic picking arm; and
repeating the step of picking the at least one first item from the third storage container and adding the at least one first item to the second storage container by use of the robotic picking arm until the third storage container is empty or the second storage container is full.

In an embodiment of the method according to the fourth aspect, the method may comprise the step of:
transferring the second storage container to, or towards, the container inlet via the second conveyor pathway, when the second storage container is full, and/or the first storage container is empty.

In an embodiment of the method according to the fourth aspect, the method may comprise the steps of:
transferring a fourth storage container from the container outlet via the second conveyor pathway to the consolidation section, the fourth storage container being empty or having room for at least one first item;
picking at least one first item from the first storage container and adding the at least one first item to the fourth storage container by use of the robotic picking arm; and
repeating the step of picking at least one first item from the first storage container and adding the at least one first item to the fourth storage container by use of the robotic picking arm until the first storage container is empty or the fourth storage container is full.

The method according to the fourth aspect may also be termed a method of internal consolidation of items in a storage system.

The methods according to the third and fourth aspect may be performed by use of any of the embodiments of the invention according to the first and second aspect.

In all aspects of the invention, the robotic picking arm is used to perform all picking and transfer movements of items accommodated in the storage containers.

The term "robotic picking arm" is intended to mean any robotic picking device suitable for picking and transfer of an item between two storage containers.

The term "conveyor pathway" is intended to mean any suitable conveyor assembly providing a pathway upon which a container may be moved. The conveyor assembly may comprise multiple conveyor units or modules, wherein each unit or module may accommodate at least one container and move said container in at least one horizontal direction. The conveyor assembly and/or the multiple conveyor units or modules may comprise any suitable combination of belts, rollers and horizontally displaceable lifting beams.

BRIEF DESCRIPTION OF THE DRAWINGS

Embodiments of the invention is described in detail by reference to the following drawings:

FIG. 5 is a perspective side view of a storage system with an exemplary robotic consolidation station having a layout similar to the schematic drawing in FIG. 4a.

FIG. 9 is a perspective topside view of the robotic consolidation station in FIG. 6 and a container relay assembly.

DETAILED DESCRIPTION OF THE INVENTION

Figure 1:
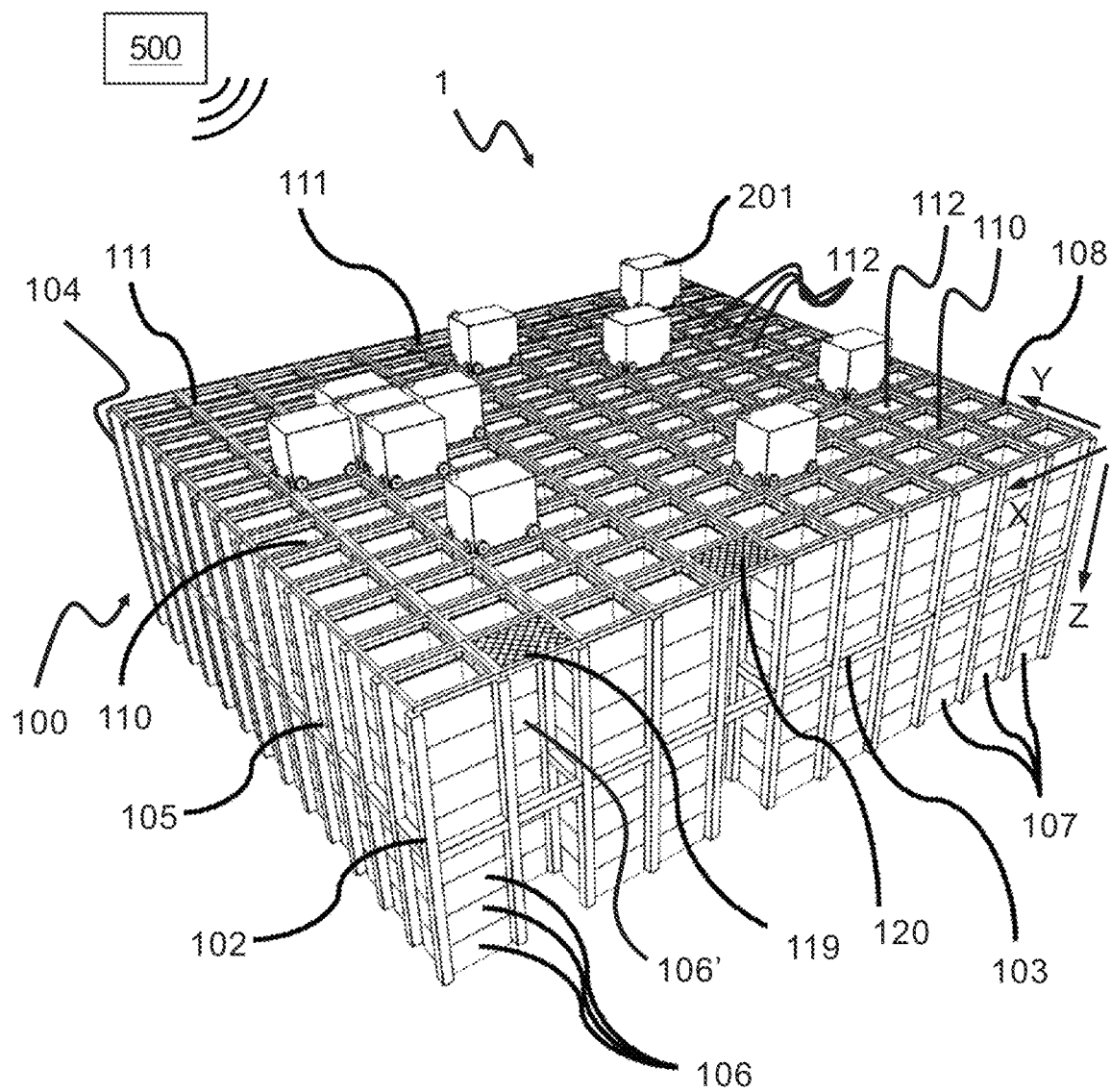
FIG. 1 is a perspective view of a framework structure of a prior art automated storage and retrieval system.
Figure 2:
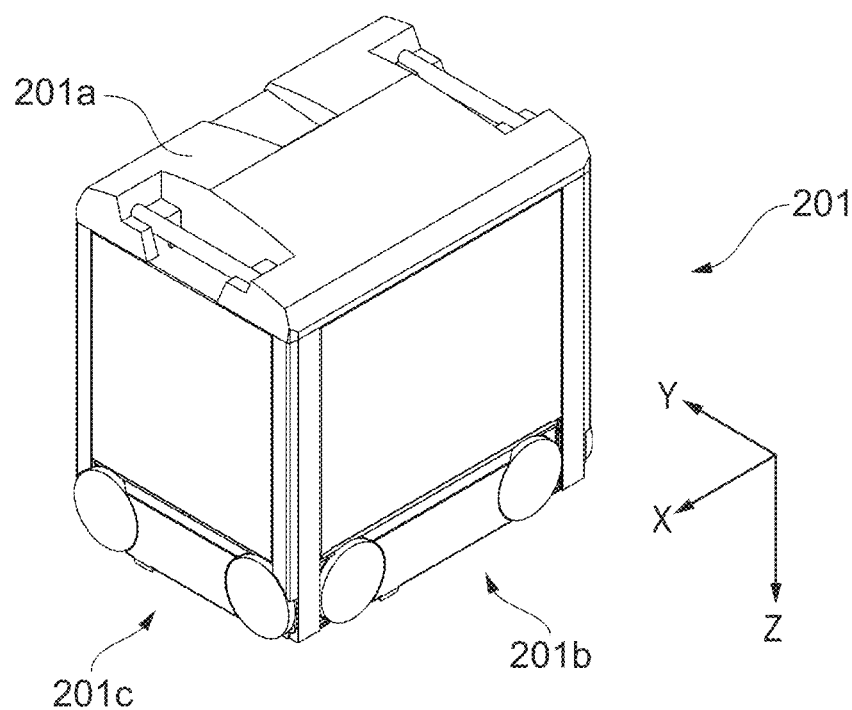
FIG. 2 is a perspective view of a prior art container handling vehicle having a centrally arranged cavity for carrying storage containers therein.
Figure 3:
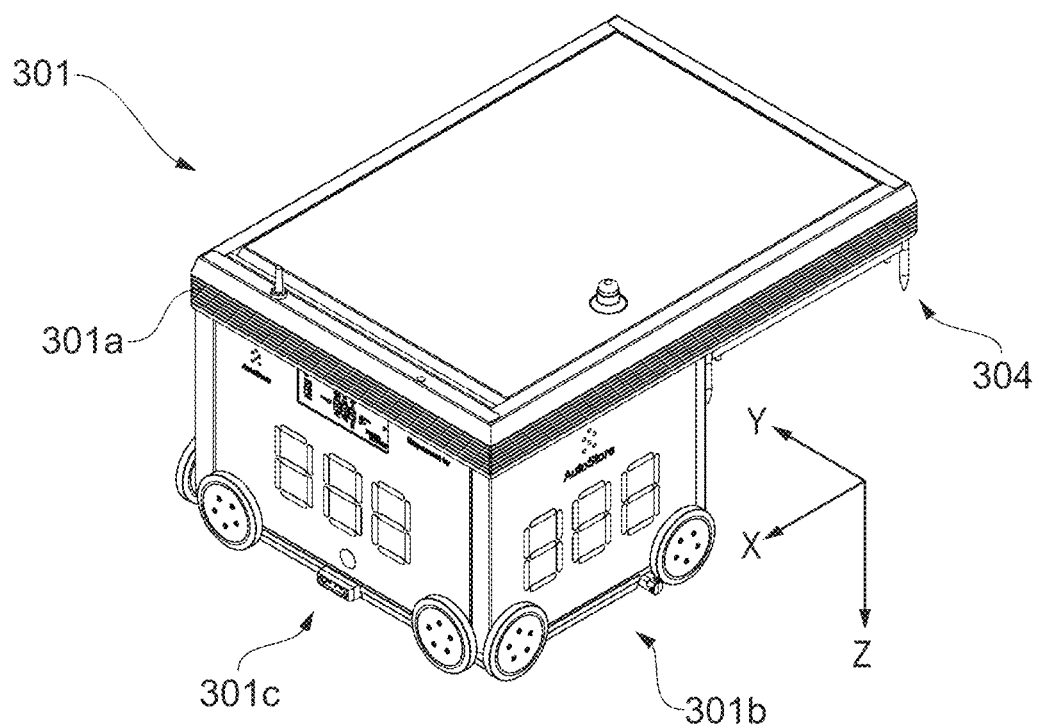
FIG. 3 is a perspective view of a prior art container handling vehicle having a cantilever for carrying storage containers underneath.

In the following, embodiments of the invention will be discussed in more detail with reference to the appended drawings. However, the drawings are not intended to limit the invention to the subject-matter depicted in the drawings.

The present invention provides an advantageous consolidation station 2 for use in a storage system in which various items are stored in a plurality of containers (i.e. storage containers or bins). The storage system used in connection with the consolidation station may advantageously be similar to the prior art storage system shown in FIG. 1. The layout of the consolidation station 2 is illustrated by the schematic drawings in FIGS. 4a and 4b.

The consolidation station 2 features a first conveyor pathway 3 for transfer of storage containers 106 accommodating items to be picked, a second conveyor pathway 4 for transfer of storage containers in which items are to be consolidated or have been consolidated and a robotic picking arm 5 arranged to reach the first conveyor pathway 3 and the second conveyor pathway 4. Each of the first conveyor pathway 3 and the second conveyor pathway 4 has a first end 6 and a second end 7, and each first end 6 is operatively connected to a common container outlet 8 of the framework structure 100 for transfer of storage containers 106 from the framework structure 100 and each second end 7 is operatively connected to a common container inlet 9 of the framework structure for transfer of storage containers 106 into the framework structure 100. In the FIGS. 4a and 4b, the consolidation station is arranged at an external sidewall of the framework structure 100, but in some cases at least parts of the consolidation structure 2 may be arranged within the framework structure or in a recess formed in the framework structure.

The first conveyor pathway 3 comprises a picking section 10, and the second conveyor pathway 4 comprises a consolidation section 11.

The robotic picking arm 5 is arranged such that items may be picked from a first storage container 106' arranged upon the picking section 10 by use of the robotic picking arm 5 and transferred to a second storage container 106" arranged upon the consolidation section 11 by use of the robotic picking arm 5. The picking section 10 and the consolidation section 11 are arranged in parallel to ensure that the robotic picking arm may move a minimum distance between the picking section and the consolidation section during a consolidation operation.

Having the consolidation station 2 connected to a common container outlet 8 and container inlet 9, through which both the first storage containers 106' and the second storage containers 106" may respectively enter or exit, is highly advantageous in that the consolidation station occupies a minimum of floor space. Further, the provision of multiple container outlets and inlets in the framework structure would also decrease the available storage space in the storage system.

Figure 4:
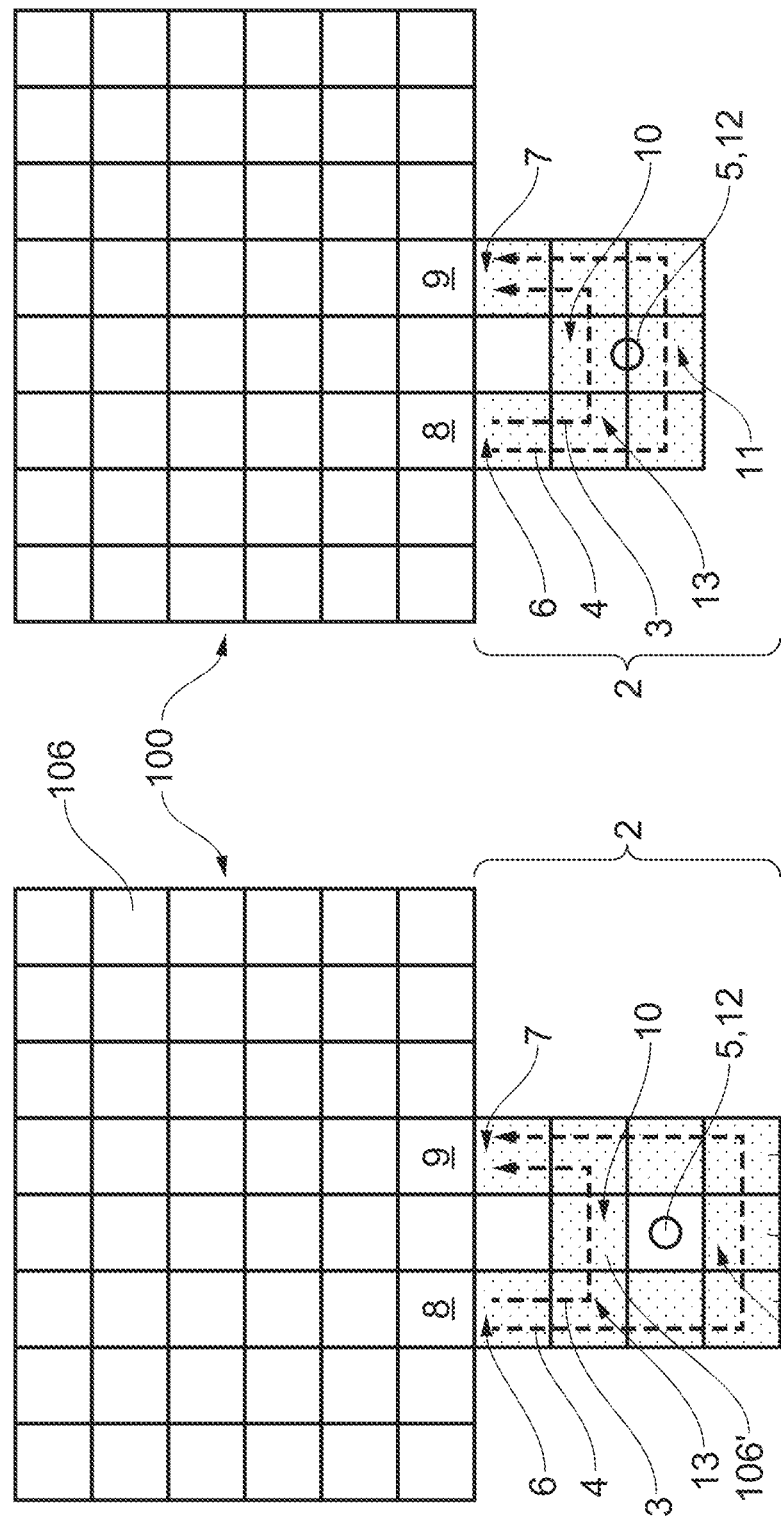
FIGS. 4a-b are schematic drawings of storage systems having exemplary robotic consolidation stations according to the invention.
Figure 5:
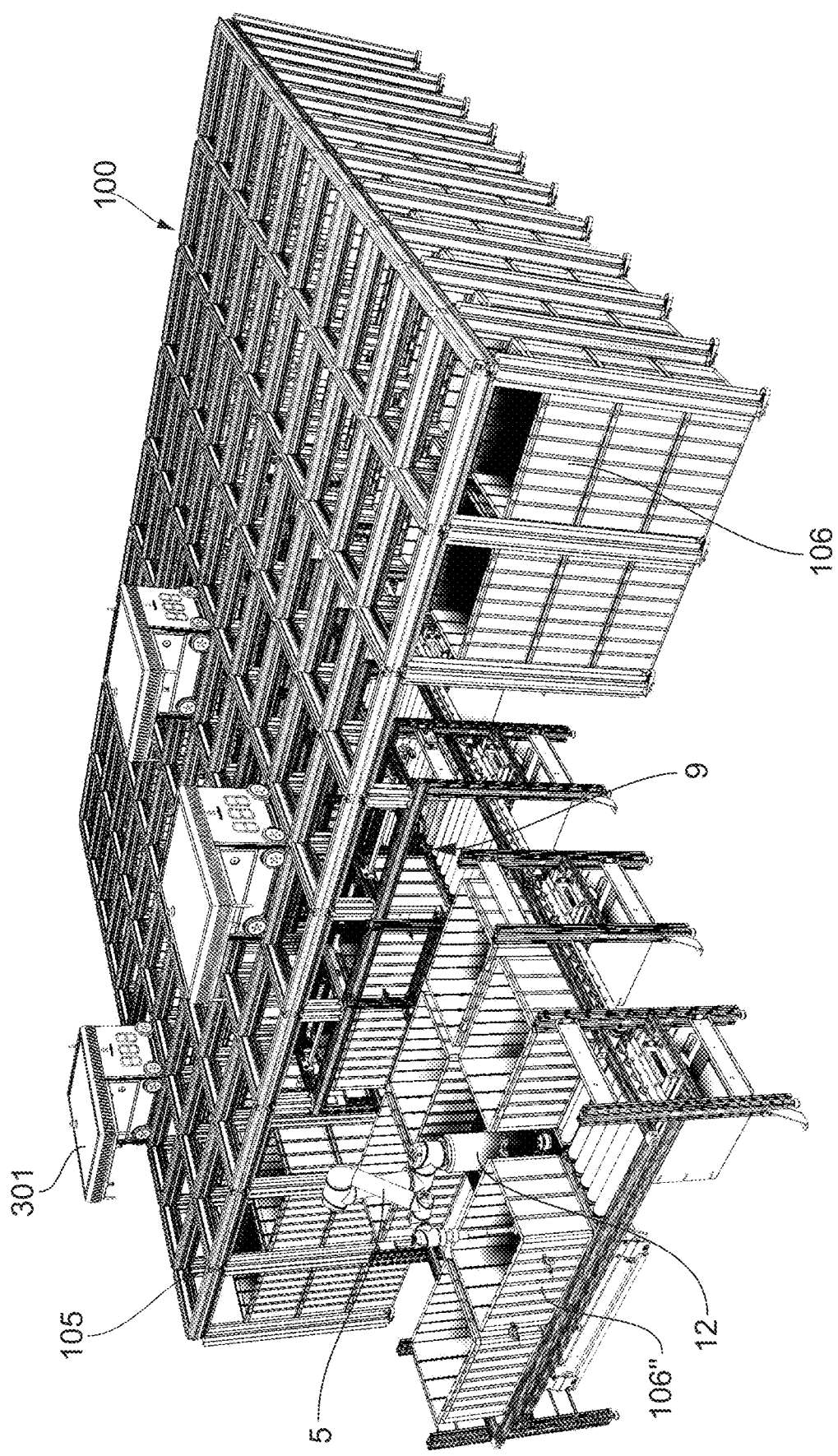
Figure 6:
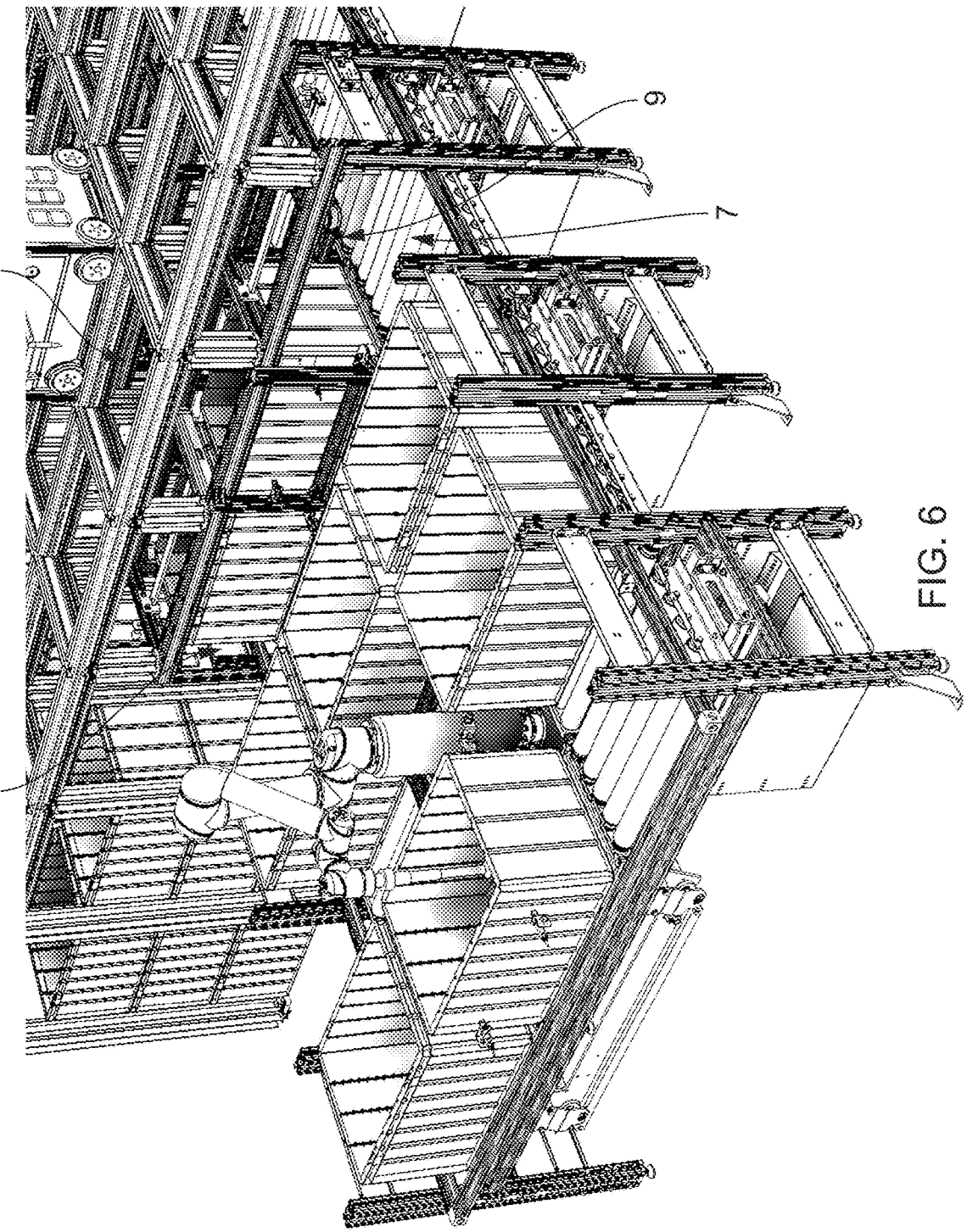
FIG. 6 is an enlarged view of the robotic consolidation station in FIG. 5.
Figure 7:
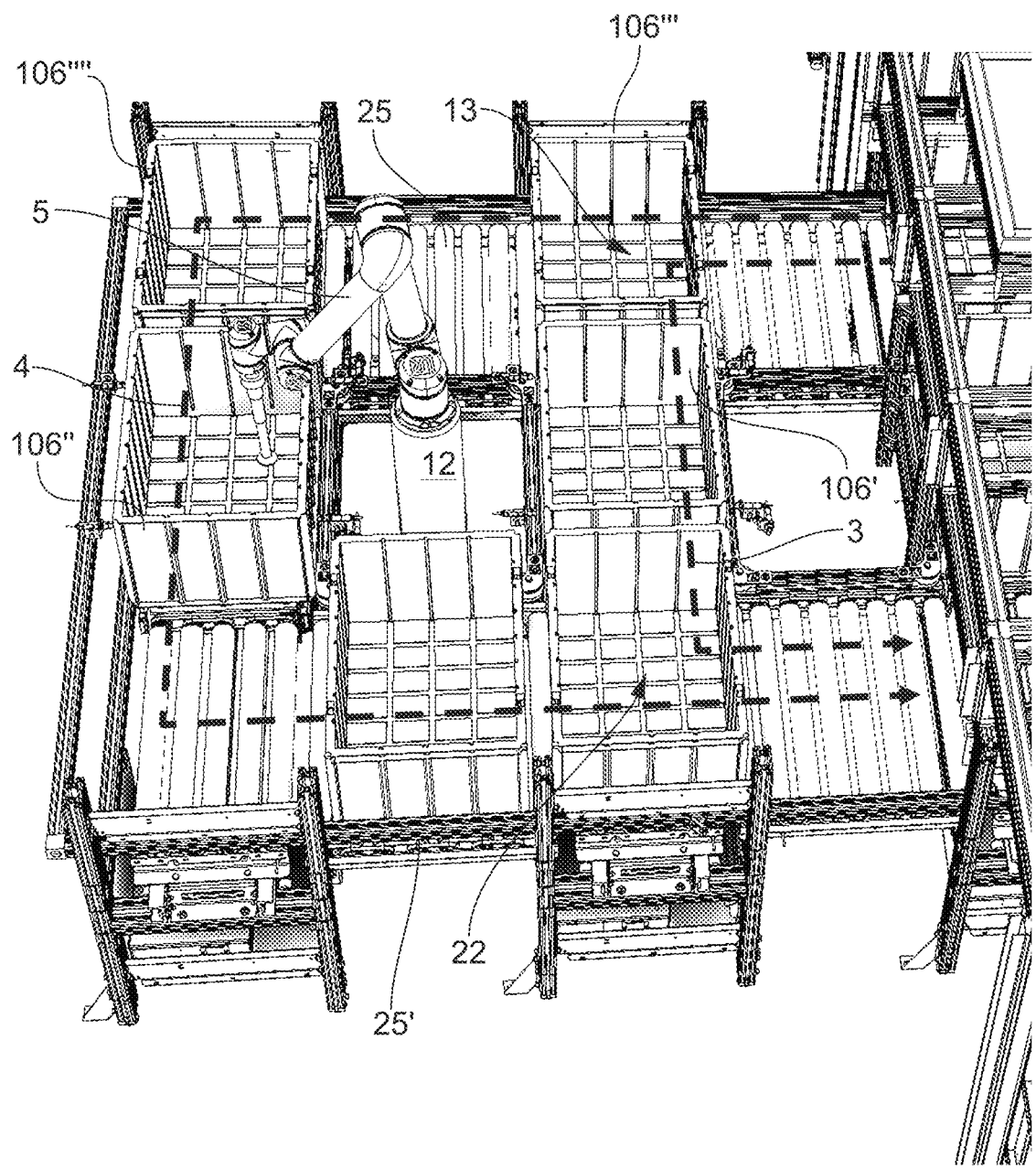
FIG. 7 is a perspective topside view of the robotic consolidation station in FIG. 6.
Figure 8:
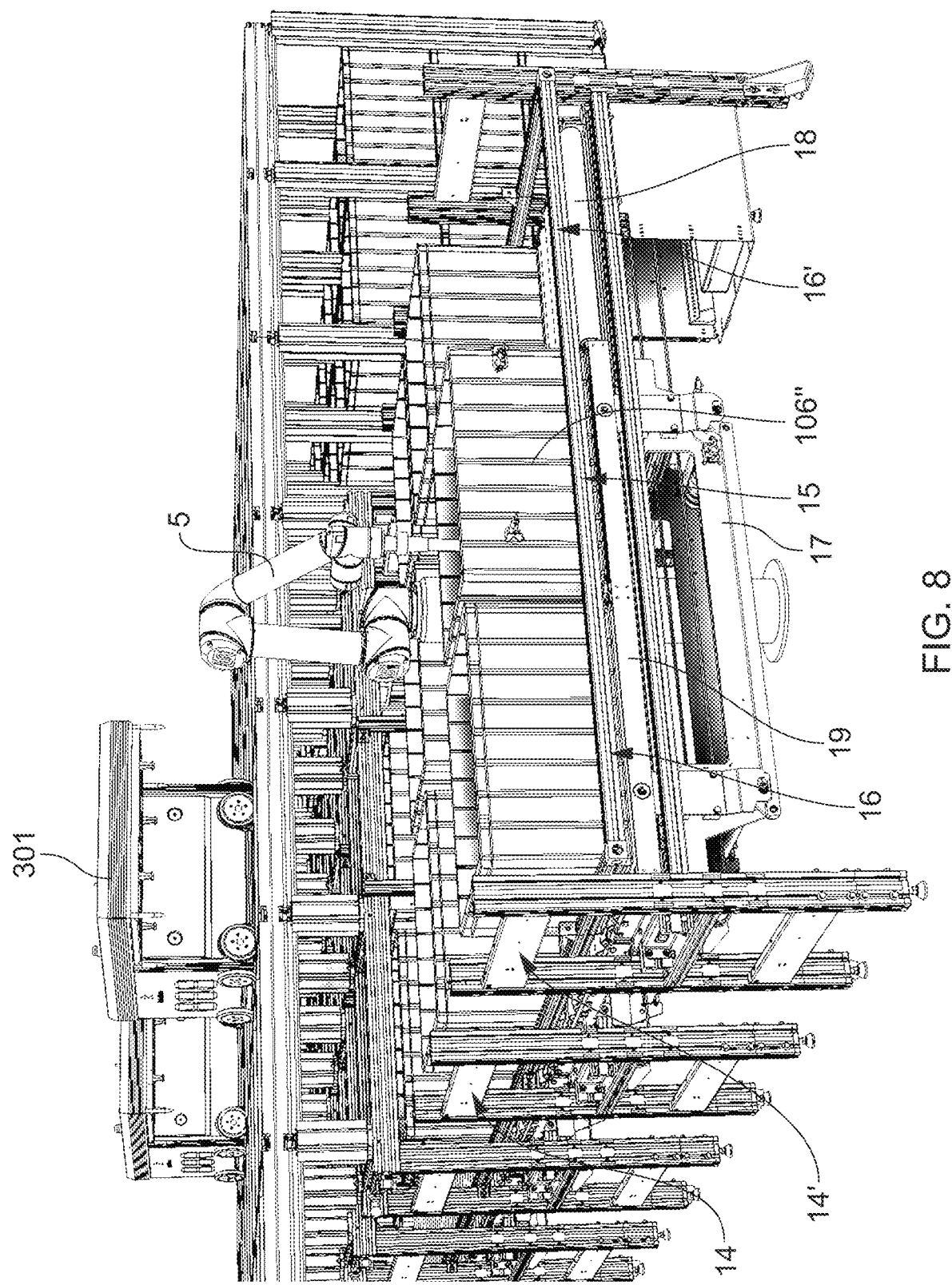
FIG. 8 is a perspective front view of the robotic consolidation station in FIG. 6.

Depending on the layout of the conveyor pathways 3,4, the robotic picking arm 5 may be arranged between the picking section 10 and the consolidation section 11, see FIG. 4a or on a gantry (not shown) arranged above the picking section 10 and the consolidation section 11, see FIG. 4b. The robotic picking arm 5 may be provided on a base 12, wherein the base 12 is positioned substantially equidistant from the picking section 10 and the consolidation section 11.

The first conveyor pathway 3 is independently operable of the consolidation section 11 of the second conveyor pathway 4 and arranged such that a first storage container 106' may be transferred from the container outlet 8 to the container inlet 9 via the picking section 10 while a second storage container 106" is arranged upon the consolidation section 11. The first conveyor pathway 3 and the second conveyor pathway 4 features a common first conveyor intersection 13, from which a container 106 exiting the container outlet 8 may be transferred in a first direction to the picking section 10 or in a second direction to the consolidation section 11, and a common second conveyor intersection 22 from which a container arriving from any of the picking section 10 and the consolidation section 11 may be transferred to a container inlet 9.

An exemplary embodiment of a consolidation station 2 connected to a framework structure 100 of a storage system is shown in FIGS. 5-9. For illustrative purposes, the consolidation station 2 and a cooperating container relay assembly 24 is shown in FIG. 9 without the framework structure 100.

In the exemplary consolidation station 2, the first conveyor pathway 3 comprises a first conveyor module 14 and the second conveyor pathway 4 comprises a second conveyor module 14'. Each conveyor module is able to accommodate a row of three containers 106 and comprises a middle container section 15, a first end container section 16 and a second end container section 16'. Each of the container sections 15,16,16' is arranged to accommodate a single container 106.

The conveyor modules 14,14' comprise a sled 17 and two parallel beams 19 (i.e. a movement or lifting assembly)

arranged to move a container 106 in a horizontal direction between any of the end container sections 16,16' and the middle container section 15. Each of the end container sections features a roller conveyor 18 arranged to transport a container 106 in a direction being perpendicular to the horizontal direction between any of the end container sections 16,16' and the middle container section 15. The sled 17 is movable in the horizontal direction between any of the end container sections 16,16' and the middle container section 15 and the two parallel beams 19 are connected to the sled 17 and arranged to lift at least one container 106 in a vertical direction. In use, a container may be moved e.g. from the middle container section 15, by raising the two parallel beams 19 to lift the container 106 and moving the container to the first end container section 16 by moving the sled 17. When positioned above the first end container section 16 the two parallel beams may be lowered such that the container is arranged upon, and may be moved by, the conveyors 18.

The picking section 10 of the exemplary consolidation station 2 is the middle container section 15 of the first conveyor module 14. The consolidation section 11 is at least comprised by the middle container section 15 of the second conveyor module 14', but the consolidation section may also comprise any of the first and second end container sections 16,16'.

The first and second conveyor modules are parallel and interconnected via their respective end container sections by intermediate conveyor elements 25,25'. The intermediate conveyor elements may accommodate a single storage container 106 and may be advantageous in providing a buffer for storage containers in which items are to be consolidated or in which items have been consolidated, or alternatively be a part of the consolidation section 11. In this specific embodiment, the intermediate conveyor elements 25,25' are also required to provide room for the base 12 of the floor-mounted robotic picking arm 5.

It should be noted that in case of a gantry-mounted robotic picking arm, the intermediate conveyor elements 25,25' are not required. An advantage of having a gantry-mounted robotic picking arm is that the picking section 10 may be arranged closer to the consolidation section 11, thus minimising the movements of the robotic picking arm.

In the present storage system, the storage containers 106 have a rectangular cross-section (i.e. the horizontal periphery of the storage containers is rectangular). To further minimize the required movement of the robotic picking arm 5, when transferring items from a first storage container 106' arranged on the picking section 10 to a second storage container 106" arranged on the consolidation section 11, the first and second conveyor modules are arranged such that the longer sides of the first and second storage container 106', 106" face toward each.

The consolidation station according to the invention is highly advantageous in that it allows for several advantageous consolidation operations to be performed.

A first exemplary consolidation operation that may be performed by the disclosed consolidation station 2 is the consolidation of one or more items of a customer order in a storage container 106". After consolidation of the customer order, the storage container 106" accommodating the customer order may be stored temporarily in the framework structure 100 or transferred via the framework structure 100 to a processing facility for packaging and shipment of the customer order. The first exemplary consolidation operation may entail the following steps:

transferring a first storage container 106', accommodating at least one first item, from the container outlet 8 via the first conveyor pathway 3 to the picking section 10 (e.g. the middle container section 15 of the first conveyor module 14);

transferring a second storage container 106" from the container outlet 8 (i.e. from the same container outlet 8 as the first storage container 106') via the second conveyor pathway 4 to the consolidation section 11 (e.g. the middle container section 15 of the second conveyor module 14'); and picking the at least one first item from the first storage container 106' and adding the at least one first item to the second storage container 106" by use of the robotic picking arm 5.

When different items are to be consolidated in the second storage container, the consolidation operation may further comprise the steps of:

transferring the first storage container 106' to, or towards, the container inlet 9 via the first conveyor pathway 3;

transferring a third storage container 106''', accommodating at least one second item, from the container outlet 8 via the first conveyor pathway 3 to the picking section 10; and picking the at least one second item from the third storage container 106''' and adding the at least one second item to the second storage container 106" by use of the robotic picking arm 5.

When one of the first item is to be consolidated in multiple storage containers, the consolidation operation may further comprise the steps of:

transferring a fourth storage container 106"" from the container outlet 8 via the second conveyor pathway 4 to the consolidation section 11; and picking at least one first item from the first storage container 106' and adding the at least one first item to the fourth storage container 106"" by use of the robotic picking arm 5.

A second exemplary consolidation process that may be performed by the inventive consolidation station 2 concerns a situation when similar or identical items are to be consolidated within the storage system to optimize the storage space utilization. For instance, in many cases multiple storage containers 106 are initially used to store the same type of items. Over time some of the items are picked from the storage containers and the initial number of storage containers are no longer required to store all the items. To free up useable storage space, the items may then be consolidated in fewer storage containers than initially needed. The prior art consolidation stations and storage systems do not have any efficient solutions for performing such consolidations. Thus, the second exemplary consolidation operation may comprise the following steps:

transferring a first storage container 106', accommodating at least one first item, from the container outlet 8 via the first conveyor pathway 3 to the picking section 10 (e.g. the middle container section 15 of the first conveyor module 14);

transferring a second storage container 106", the second storage container 106" may be empty or having room for at least one first item, from the container outlet 8 via the second conveyor pathway 4 to the consolidation section 11; and picking the at least one first item from the first storage container 106' and adding the at least one first item to the second storage container 106" by use of the robotic picking arm 5; and repeating the step of picking the at least one first item from the first storage container 106' and adding the at least one first item to the second storage container 106″ by use of the robotic picking arm 5 until the first storage container 106′ is empty or the second storage container 106″ is full.

When the first storage container 106′ is empty, the second exemplary consolidation process may comprise the step of:
  transferring the first storage container 106′ to, or towards, the container inlet 9 via the first conveyor pathway 3.

When the first storage container 106′ is empty, the second exemplary consolidation process may comprise the further steps of:
  transferring a third storage container 106′″, accommodating at least one first item, from the container outlet 8 via the first conveyor pathway 3 to the picking section 10; and
  picking the at least one first item from the third storage container 106″ and adding the at least one first item to the second storage container 106″ by use of the robotic picking arm 5; and
  repeating the step of picking the at least one first item from the third storage container 106′″ and adding the at least one first item to the second storage container 106″ by use of the robotic picking arm 5 until the third storage container 106′″ is empty or the second storage container 106″ is full.

When the second storage container 106″ is full and/or the first storage container 106′ is empty, the second exemplary consolidation process may comprise the step of:
  transferring the second storage container 106″ to, or towards, the container inlet 9 via the second conveyor pathway 3.

When the second storage container 106″ is full and/or the first storage container 106′ is empty, the second exemplary consolidation process may comprise the further steps of:
  transferring a fourth storage container 106″″, the fourth storage container 106″″ may be empty or having room for at least one first item, from the container outlet 8 via the second conveyor pathway 4 to the consolidation section 11; and
  picking at least one first item from the first storage container 106′ and adding the at least one first item to the fourth storage container 106″″ by use of the robotic picking arm 5; and
  repeating the step of picking at least one first item from the first storage container 106′ and adding the at least one first item to the fourth storage container 106″″ by use of the robotic picking arm 5 until the first storage container 106′ is empty or the second storage container 106″ is full.

In the second exemplary consolidation process, the first storage container is returned to the framework structure when empty and is consequently available for storage of new items, while the utilization of the capacity of the second storage container is improved.

In the exemplary storage system shown in FIGS. 5-8, the framework structure 100 comprises a plurality of port columns 119,120 through which a storage container 106 may be transferred between a top level of the framework structure 100 and a corresponding transfer position 23 at a lower level of the framework structure 100. Each of the transfer positions 23 is operably connected to the robotic consolidation station 2 via a container relay assembly 24 and the container inlet 8 and the container outlet 9 of the framework structure 100.

The container relay assembly 24 is arranged to transfer a storage container 106 between any of the transfer positions 23 and the consolidation station 2. The container relay assembly 24 comprises a plurality of relay conveyor modules 14″-14″″. In the exemplary embodiment, the relay conveyor modules 14″-14″″ are substantially similar to the conveyor modules 14,14′ of the consolidation station 2. Each of the relay conveyor modules 14″-14″″ is able to accommodate a row of three storage containers 106 and comprises a middle container section 15 arranged at a transfer position 23, a first end container section 16 and a second end container section 16′, each of the container sections 15,16, 16′ is arranged to accommodate a single storage container 106. Each relay conveyor module 14″-14″″ comprises a sled 17 and two parallel beams 19 (i.e. a lifting or moving assembly) arranged to lift and move a container in a horizontal direction between any of the end container sections 16,16′ and the middle container section 15. Each of the end container sections 16,16′ features a roller conveyor 18 arranged to transport a storage container in a direction perpendicular to the horizontal direction in which the sled 17 and beams 19 may move.

The relay conveyor modules 14″-14″″ are interconnected at their respective first and second end container sections 16,16′ by conveyor elements 26 able to accommodate at least one storage container 106 and transport the at least one storage container in the same direction as the roller conveyors 18.

The present invention is illustrated by use of an exemplary embodiment featuring a highly advantageous conveyor module 14. However, a consolidation station 2 according to the invention may also be obtained by use of other suitable combinations of conveyor elements for non-manual transfer of storage containers, such as roller conveyors, belt conveyors and shuttle conveyors.

The invention claimed is:

1. A robotic consolidation station for use in a storage system, the storage system comprising a framework structure configured to store storage containers, the robotic consolidation station comprising:
  a first conveyor pathway configured to transfer storage containers accommodating items to be picked, a second conveyor pathway configured to transfer storage containers in which items are to be consolidated or have been consolidated, and a robotic picking arm arranged to reach the first conveyor pathway and the second conveyor pathway, wherein:
  each of the first conveyor pathway and the second conveyor pathway comprises a first end and a second end, wherein each first end is configured to be operatively connected to a container outlet of the framework structure for transferring storage containers from the framework structure, each second end is configured to connect to a container inlet of the framework structure for transferring storage containers into the framework structure, and the first conveyor pathway and the second conveyor pathway have their respective first ends in common and/or the first conveyor pathway and second conveyor pathway have their respective second ends in common;
  the first conveyor pathway comprises a picking section, and the second conveyor pathway comprises a consolidation section;
  the robotic picking arm is configured to pick items from a first storage container arranged upon the picking section and transfer the items to a second storage container arranged upon the consolidation section; and
  the first conveyor pathway is independently operable of the consolidation section and configured to transfer a first storage container from a container outlet to a container inlet via the picking section while a second storage container is arranged upon the consolidation section.

2. The robotic consolidation station according to claim 1, wherein the consolidation section is configured to have multiple storage containers arranged upon it, while a first storage container is transferred from a container outlet to a container inlet via the picking section.

3. The robotic consolidation station according to claim 1, wherein the picking section is arranged parallel to the consolidation section.

4. The robotic consolidation station according to claim 1, wherein the first conveyor pathway and the second conveyor pathway comprise a common first conveyor intersection configured to transfer a storage container exiting a container outlet in a first direction to the picking station or in a second direction to the consolidation section.

5. The robotic consolidation station according to claim 1, wherein the first conveyor pathway and the second conveyor pathway comprise a common second conveyor intersection configured to transfer a storage container arriving from any of the picking section and the consolidation section into a container inlet.

6. The robotic consolidation station according to claim 1, wherein the first conveyor pathway comprises a first conveyor module and the second conveyor pathway comprises a second conveyor module, each conveyor module is configured to accommodate a row of three storage containers and each conveyor module comprises a middle container section, a first end container section, and a second end container section, each of the container sections is arranged to accommodate a single storage container, each of the conveyor modules comprises a movement assembly arranged to move a storage container in a horizontal direction between any of the end container sections and the middle container section, and each of the end container sections features a roller conveyor arranged to transport a storage container in a direction perpendicular to the horizontal direction between any of the end container sections and the middle container section.

7. The robotic consolidation station according to claim 6, wherein the picking section is the middle container section of the first conveyor module, and the consolidation section comprises the middle container section of the second conveyor module.

8. A storage system comprising a robotic consolidation station according to claim 1, wherein
the storage system comprises a framework structure configured to store storage containers, a container outlet configured to transfer storage containers from the framework structure, and a container inlet configured to transfer storage containers into the framework structure, wherein the first conveyor pathway and the second conveyor pathway of the robotic consolidation station is operably connected to the container outlet and the container inlet.

9. The storage system according to claim 8, comprising at least one container handling vehicle, and wherein the framework structure comprises multiple storage columns configured to store storage containers on top of one another in vertical stacks, and wherein the at least one container handling vehicle is configured to operate on a rail system at a top level of the framework structure and retrieve storage containers from, and store storage containers in, the storage columns, and configured to transport the storage containers horizontally across the rail system, and wherein the framework structure comprises at least one port column configured to transfer a storage container between a top level of the framework structure and a transfer position at a lower level of the framework structure, the transfer position being operably connected to the robotic consolidation station via the container outlet and the container inlet.

10. The storage system according to claim 9, wherein the storage system comprises a container relay assembly configured to transfer a storage container between the transfer position and the consolidation station, the container relay assembly comprising at least one relay conveyor module configured to accommodate three storage containers in a row and comprising a middle container section arranged at the transfer position, a first end container section, and a second end container section, each of the container sections arranged to accommodate a single storage container, and the at least one relay conveyor module comprising a movement assembly arranged to move a storage container in a horizontal direction between any of the end container sections and the middle container section, and roller conveyors arranged to transport a storage container in a direction perpendicular to the horizontal direction between any of the end container sections and the middle container section.

11. A method of consolidating items stored in a storage system comprising a robotic consolidation station, wherein
the storage system comprises a framework structure configured to store storage containers, a container outlet configured to transfer storage containers from the framework structure, and a container inlet configured to transfer storage containers into the framework structure; and
the robotic consolidation station comprises a first conveyor pathway configured to transfer storage containers accommodating items to be picked, a second conveyor pathway configured to transfer storage containers in which items are to be consolidated or have been consolidated, and a robotic picking arm arranged to reach the first conveyor pathway and the second conveyor pathway, wherein:
each of the first and second conveyor pathways comprises a first end and a second end, wherein each first end is operatively connected to the container outlet and each second end is operatively connected to the container inlet;
wherein the first conveyor pathway and the second conveyor pathway have their respective first ends in common and/or the first conveyor pathway and second conveyor pathway have their respective second ends in common; and
the first conveyor pathway comprises a picking section, and the second conveyor pathway comprises a consolidation section; and
the method comprises:
transferring a first storage container, accommodating at least one first item, from the container outlet via the first conveyor pathway to the picking section;
transferring a second storage container from the container outlet via the second conveyor pathway to the consolidation section; and
picking the at least one first item from the first storage container and adding the at least one first item to the second storage container by use of the robotic picking arm.

12. The method according to claim 11, comprising:
transferring the first storage container to the container inlet via the first conveyor pathway;

transferring a third storage container, accommodating at least one second item, from the container outlet via the first conveyor pathway to the picking section; and picking the at least one second item from the third storage container and adding the at least one second item to the second storage container by use of the robotic picking arm.

13. The method according to claim 11, wherein the first storage container accommodates a plurality of first items, comprising:

transferring a fourth storage container from the container outlet via the second conveyor pathway to the consolidation section; and picking at least one first item from the first storage container and adding the at least one first item to the fourth storage container by use of the robotic picking arm.

14. A method of consolidating items stored in a storage system comprising a robotic consolidation station, wherein the storage system comprises a framework structure configured to store storage containers, a container outlet configured to transfer storage containers from the framework structure, and a container inlet configured to transfer storage containers into the framework structure; and the consolidation station comprises a first conveyor pathway configure to transfer storage containers accommodating items to be picked, a second conveyor pathway configured to transfer storage containers in which items are to be consolidated or have been consolidated, and a robotic picking arm arranged to reach the first conveyor pathway and the second conveyor pathway, wherein:

each of the first and second conveyor pathways comprises a first end and a second end, wherein each first end is operatively connected to the container outlet and each second end is operatively connected to the container inlet; and wherein the first conveyor pathway and the second conveyor pathway have their respective first ends in common and/or the first conveyor pathway and second conveyor pathway have their respective second ends in common; and the first conveyor pathway comprises a picking section, and the second conveyor pathway comprises a consolidation section; and the method comprises:

transferring a first storage container, accommodating at least one first item, from the container outlet via the first conveyor pathway to the picking section;

transferring a second storage container, the second storage container may be empty or having room for at least one first item, from the container outlet via the second conveyor pathway to the consolidation section; and picking the at least one first item from the first storage container and adding the at least one first item to the second storage container by use of the robotic picking arm; and repeating the step of picking the at least one first item from the first storage container and adding the at least one first item to the second storage container by use of the robotic picking arm until the first storage container is empty or the second storage container is full.

15. The method according to claim 14, comprising:

transferring the first storage container to, or towards, the container inlet via the first conveyor pathway, when the first storage container is empty.

16. The method according to claim 15, comprising:

transferring a third storage container, accommodating at least one first item, from the container outlet via the first conveyor pathway to the picking section;

picking the at least one first item from the third storage container and adding the at least one first item to the second storage container by use of the robotic picking arm; and repeating the step of picking the at least one first item from the third storage container and adding the at least one first item to the second storage container by use of the robotic picking arm until the third storage container is empty or the second storage container is full.

17. The method according to claim 14, comprising:

transferring the second storage container to, or towards, the container inlet via the second conveyor pathway, when the second storage container is full and/or the first storage container is empty.

18. The method according to claim 17, comprising:

transferring a fourth storage container from the container outlet via the second conveyor pathway to the consolidation section, the fourth storage container being empty or having room for at least one first item;

picking at least one first item from the first storage container and adding the at least one first item to the fourth storage container by use of the robotic picking arm; and repeating the step of picking at least one first item from the first storage container and adding the at least one first item to the fourth storage container by use of the robotic picking arm until the first storage container is empty or the fourth storage container is full.

* * * * *